United States Patent
Norton et al.

(10) Patent No.: US 10,239,112 B2
(45) Date of Patent: Mar. 26, 2019

(54) METHOD OF REDUCING CYCLE TIME FOR FLOW DRILL SCREW OPERATIONS

(71) Applicant: Ford Global Technologies, LLC, Dearborn, MI (US)

(72) Inventors: Thomas Norton, Ann Arbor, MI (US); Amanda Kay Freis, Ann Arbor, MI (US); Anthony J. Grima, South Rockwood, MI (US); Garret Sankey Huff, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 442 days.

(21) Appl. No.: 14/883,782

(22) Filed: Oct. 15, 2015

(65) Prior Publication Data

US 2017/0106430 A1    Apr. 20, 2017

(51) Int. Cl.
  *F16B 5/02*    (2006.01)
  *B21J 5/06*    (2006.01)
  *F16B 25/00*    (2006.01)
  *F16B 25/10*    (2006.01)

(52) U.S. Cl.
  CPC .............. *B21J 5/066* (2013.01); *F16B 5/02* (2013.01); *F16B 25/0031* (2013.01); *F16B 25/0084* (2013.01); *F16B 25/106* (2013.01)

(58) Field of Classification Search
  CPC ... B21J 5/066; F16B 25/0084; F16B 25/0031; F16B 25/106; F16B 5/02
  See application file for complete search history.

(56) References Cited

U.S. PATENT DOCUMENTS

| | | | |
|---|---|---|---|
| 2010/0183404 A1* | 7/2010 | Draht | F16B 15/06 411/455 |
| 2010/0275669 A1* | 11/2010 | Vollet | B21D 22/04 72/324 |
| 2013/0195579 A1 | 8/2013 | Freis | |
| 2017/0058934 A1* | 3/2017 | Haak | F16B 5/02 |

FOREIGN PATENT DOCUMENTS

| | | |
|---|---|---|
| DE | 19634417 A1 | 3/1998 |
| DE | 202008015352 U1 | 2/2009 |

* cited by examiner

*Primary Examiner* — John C Hong
(74) *Attorney, Agent, or Firm* — Raymond L. Coppiellie; Brooks Kushman P.C.

(57) ABSTRACT

A method of reducing the cycle time required for flow-drill screw operations by providing a dimple on a part that is engaged by a flow-drill screw. A tip of the flow-drill screw engages a contact band at a location spaced from the tip of the distal end of the flow-drill screw and base portion of the dimple. Friction between the flow-drill screw tip and dimple creates a heat concentration area and results in displaced material forming a threaded sleeve. The flow-drill screw is secured by the threads of the threaded sleeve to secure the top part to the bottom part.

17 Claims, 3 Drawing Sheets

METHOD OF REDUCING CYCLE TIME FOR FLOW DRILL SCREW OPERATIONS

TECHNICAL FIELD

This disclosure relates to a process for joining parts with flow-drill screws.

BACKGROUND

Flow-drill screws are used to join parts together in one-sided joining operations. Flow-drill screws are threaded fasteners that have a specialized tip that is adapted to penetrate a part by heating the material of the part until the part is locally softened. The flow-drill screw rotates at high speed (i.e. 5,000 rpm) with a substantial axial force (i.e. 1.5 kN) being applied to the part. The material is heated and softened until it is plastically deformable. The rotational speed and axial force are substantially reduced to allow the material to form a threaded sleeve or collar around the flow-drill screw threads on the screw located between the tip and the head of the fastener. The screw is then rotated at a slower speed to tighten the screw into the in-situ formed threaded sleeve, compressing the parts to be joined between the threaded connection and the head of the screw.

One of the advantages of flow drill screws is that they save time and process steps because there is normally no need to provide a hole before inserting the screw and there is no need to tap threads or assemble a nut to a bolt. However, for complex products such as automotive vehicles, airplanes and off-road vehicles that have parts joined by a large number of fasteners, the cycle time (i.e. 2-6 seconds) required to insert a large number of screws may exceed the time available in a manufacturing operation.

In some assembly operations, parts may be secured together with adhesives in addition to flow-drill screws. If adhesive is applied between two panels to be joined, the flow-drill screw operation may be slowed by the insulative effect of the adhesive that reduces the rate of heat transfer from the part on the insertion side of the assembly to the part on the exit side of the assembly. In addition, the heat developed to penetrate the parts may cause the adhesive to foam and may result in degraded adhesive properties.

Some assemblies may include parts that are made of two different types of materials. For example, a polymer part may need to be assembled to an aluminum part. It may be difficult to effectively transfer heat through the polymer part to the second part.

This disclosure is directed to solving the above problems and other problems as summarized below.

SUMMARY

According to one aspect of this disclosure, a method is disclosed for assembling parts with a flow-drill screw. The method includes the step of forming a dimple on an insertion side of a first part and a protrusion on a contact side of the first part. A dimple is defined as a depression or indentation on a surface. The method continues with the step of driving a flow drill screw into the first part with the protrusion in contact with a second part. The flow drill screw is driven through the first part and the second part to secure the first part to the second part.

According to other aspects of the above method, the dimple may be conically shaped. The sides of the dimple may be disposed at an angle of between 30° and 60° relative to a surface adjacent the dimple on the insertion side of the first part. The flow drill screw may have a convex curved tip that engages the dimple at a location spaced above a base area of the dimple. The dimple may be an elongated slot that includes tapered sides extending from the insertion side of the first part to a base area. The base area as referred to herein is the deepest area of the dimple and includes the pointed end of the dimple. The dimple has a lead-in surface between the sides and the insertion side.

According to other aspects of this disclosure, an adhesive may be applied between the contact side of the first part and the second part. The protrusion penetrates the adhesive that facilitates heat transfer from the protrusion to the second part without the adhesive insulating the second part from heat developed in the protrusion.

According to a different aspect of this disclosure, a method of assembling parts with a flow-drill screw is disclosed that includes the steps of forming an opening in a first part and forming a dimple on a second part. The first part is then assembled to the second part with the opening aligned with the dimple. A flow-drill is then inserted through the opening and is rotated into the dimple to secure the first part to the second part.

According to another aspect of this disclosure, a method is disclosed for inserting a flow-drill screw into an assembly. The method includes the step of forming a dimple in an insertion side of a part. The flow drill screw is then rotated against a contacted area of a sidewall of the dimple to develop heat concentrated above a base area, without initially contacting the base area of the dimple. A contacted area within the dimple is softened and the contacted area and the base area are formed into a threaded collar.

According to other aspects of the disclosure of the latter method, the method may include the step of rotating the flow-drill screw to secure the flow-drill screw into the threaded collar. The flow-drill screw has a tip including an arcuate, convex sidewall that terminates in a point. The convex sidewall of the tip contacts the dimple at a location spaced from the base area.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
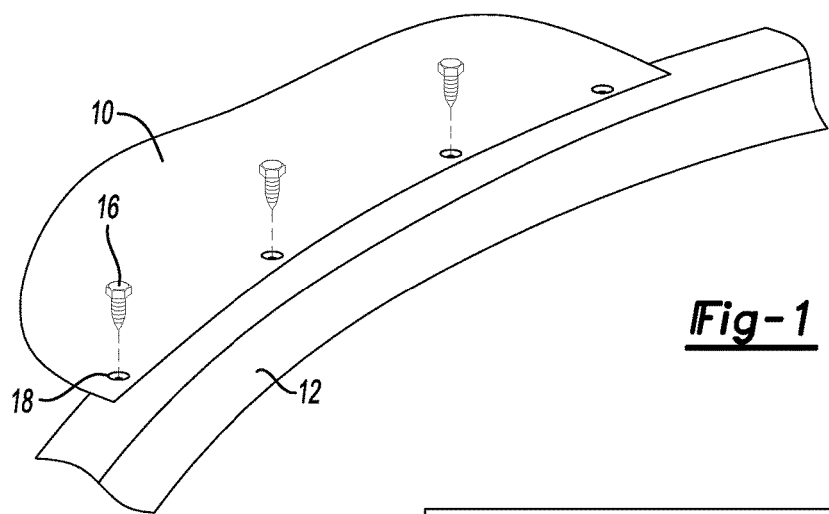
FIG. 1 is a fragmentary perspective view of two parts that are assembled together with a plurality of flow-drill screws assembled according to the disclosed method.

Referring to FIG. 1, a first part 10 and second part 12 are partially illustrated that are secured together in part by flow-drill screws 16. The flow-drill screws 16 are shown in a position to be inserted into a plurality of dimples 18 that are conical in shape and recessed into the first part 10.

Figure 2:
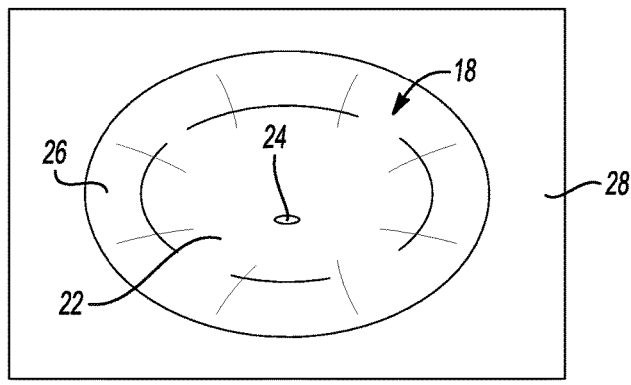
FIG. 2 is a fragmentary plan view of a conical dimple that may be used in the practice of one embodiment of the disclosed method.

Referring to FIG. 2, the dimples 18 include a conical sidewall 22 that extends to a base area 24. The base area 24 is pointed and is the deepest portion of the recess forming the dimples 18. A lead-in surface 26 is provided on the dimple 18 that extends from the insertion side 28, or insertion surface, to the conical sidewall 22.

Figure 3:
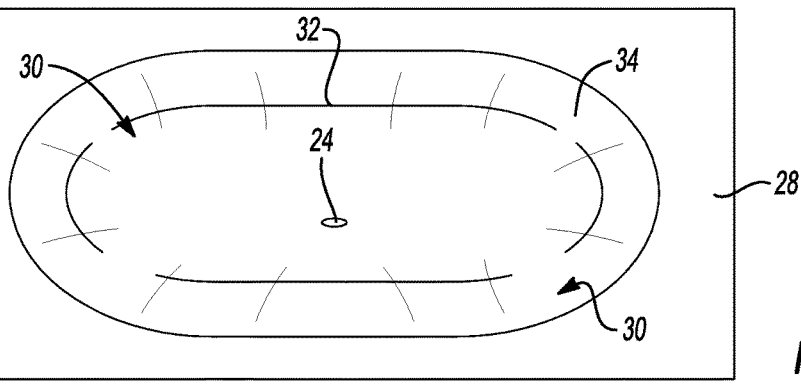
FIG. 3 is a fragmentary plan view of elongated slot-shaped dimple that may be used in the practice of an alternative embodiment of the disclosed method.

Referring to FIG. 3, in an alternative embodiment, a slot-shaped dimple 30, may be provided that includes arcuate sidewalls 32 that extend from a lead-in surface 34 provided between the sidewalls 32 and the insertion side 28. The elongated slot-shaped dimple facilitates installation of the flow-drill screws because flow-drill screws 16 may be installed within a range of locations defined by the slot-shaped dimple 30 and must only be precisely aligned in the lateral or transverse vehicle direction to be inserted between the sidewalls 32 that are elongated in the longitudinal vehicle direction.

Figure 4:
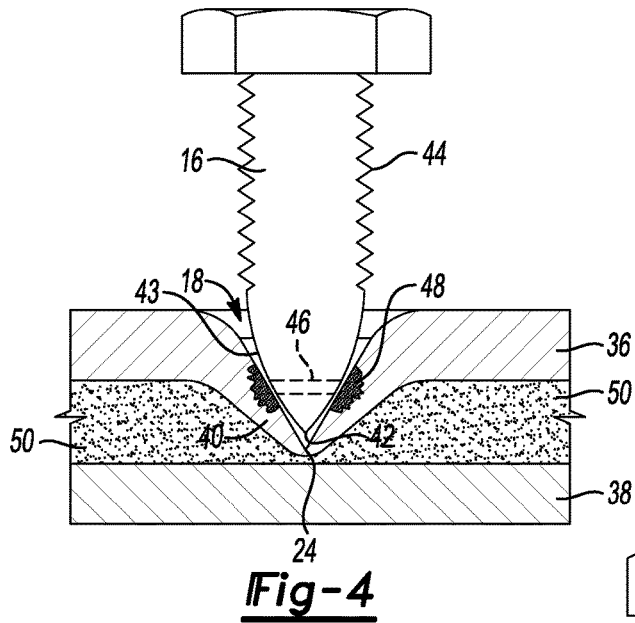
FIG. 4 is a diagrammatic cross-sectional view of a flow-drill screw as it is initially inserted into and rotated in a dimple in a first part that is to be attached to a second part by the flow-drill screw and an adhesive.
Figure 5:
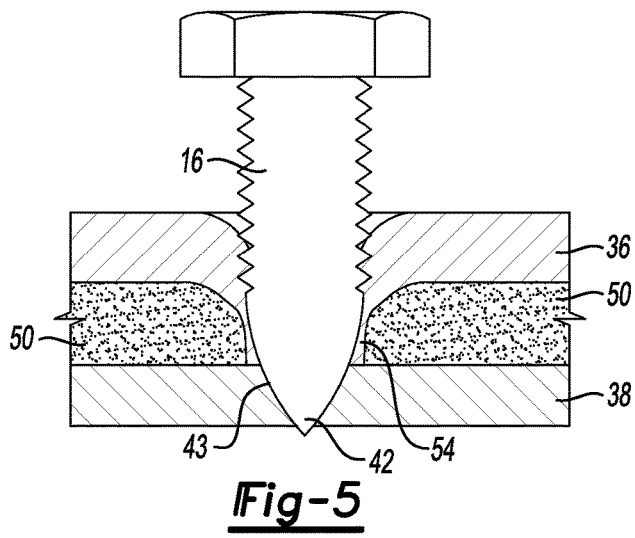
FIG. 5 is a view similar to FIG. 4 showing the flow-drill screw softening the first part, forming a sleeve with material displaced from the first part, and penetrating the second part.
Figure 6:
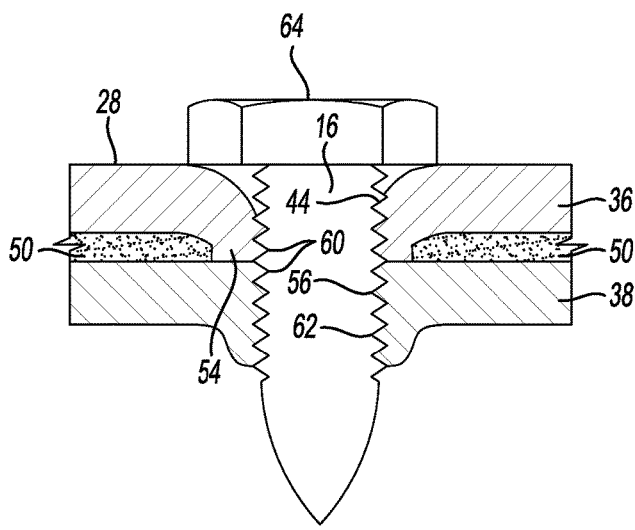
FIG. 6 is a view similar to FIG. 4 showing the flow-drill screw fully inserted into the assembly and connecting the first and second parts by the threaded connection and the head.

Referring to FIGS. 4-6, one embodiment of the process for reducing cycle time for flow-drill screw operations is illustrated wherein a top part 36 is disposed above a bottom part 38. It should be understood that the reference to the top part 36 and bottom part 38 refers to their position in the figures and does not limit the spatial orientation of the two parts 36 and 38 that may be inverted in actual use or provided as inner and outer walls.

Referring to FIG. 4, the top part 36 includes a protrusion 40 that is formed in the part 36 when the dimple 18 is formed in the top part 36. The dimple 18 is formed preferably in a sheet metal forming operation as part of the process of forming the top part or outer panel. The dimple 18 is preferably formed in the stamping/forming process. The dimple 18 provides a self-locating point for the flow-drill screw or other self-tapping mechanical fasteners. The top part 36 is assembled to the bottom part 38 with the protrusion 40 contacting the bottom part 38. The tip 42 of the flow-drill screw 16 is spaced from the base area 24 of the dimple 18. The base area 24 of the dimple 18 is the pointed terminus of the recess or dimple 18.

A plurality of threads 44 are provided on the flow-drill screws 16 that serve the purpose of forming threads in the sleeve formed by the flow-drill screws 16 and also engaging the threads formed to secure the flow-drill screws 16 as will be explained with reference to FIGS. 5 and 6 below.

The tip 42 of the fastener 16 has a convex sidewall 43 that forms an arcuate curved outer surface. The convex sidewall 43 contacts the conical sidewall 22 of the dimple 18 at a location spaced above the base area 24. The sidewall 22 of the dimple 18 is preferably disposed at an angle of between 30° and 60° relative to a central axis of the dimple 18. The curvature of the convex sidewall 43 is selected to cause the tip 42 to contact the sidewall 22 at a contact band 46.

The tip 42 of the flow-drill screws 16 contact the dimple 18 at the contact band 46 that is spaced above the tip 42 of the flow-drill screws 16 and above the base area 24 of the dimple 18. The contact band 46 is the location where the convex sidewall 43 of the tip 42 engages the conical sidewall 22 of the dimple 18. Friction at the contact band 46 causes heat to be focused in a heat focused area 48 shown on the top part 36.

An adhesive 50 is illustrated between the top part 36 and bottom part 38. The protrusion 40 penetrates the adhesive 50 to minimize thermally insulating the bottom part 38 from the top part 36 in the area around the protrusion 40. Heat developed by rotation of the flow-drill screws 16 initially softens the top part 36 and is transferred through the protrusion 40 directly to the bottom part 38.

As shown in FIG. 5, the flow-drill screw 16 is shown with its tip 42 penetrating through the top part 36 and entering the bottom part 38. As the tip 42 of the flow-drill screw 16 heats the panels, displaced material 54 from the top part 36 and bottom part 38 is softened.

Referring to FIG. 6, the displaced material (shown in FIG. 5) forms a threaded sleeve 56. Threads 60 within the threaded sleeve 56 are formed by the threads 44 of the flow-drill screws 16. A threaded hole 62 is also formed in the bottom part 38. The cycle time required to form the threaded hole 62 is reduced because heat is readily transferred from the protrusion 40 to the bottom part 38. The flow-drill screw 16 includes a head 64 that engages the insertion side 28 of the top part 36 to secure the top part 36 to the bottom part 38. The threaded sleeve 56 functions as a cylindrical bushing that surrounds the installed flow-drill screw 16. The tip 42 of the flow-drill screw 16, as shown, protrudes below the bottom part 38. The adhesive 50 does not insulate the bottom part 38 from the top part 36 in the area around the protrusion 40. The heat focused area 48 is heated by the flow-drill screw 16 frictionally engaging the contact band 46 of the dimple 18 and results in more rapid heating and softening of other parts of the dimple 18, such as the base area 24, formed in the top part 36.

Figure 7:
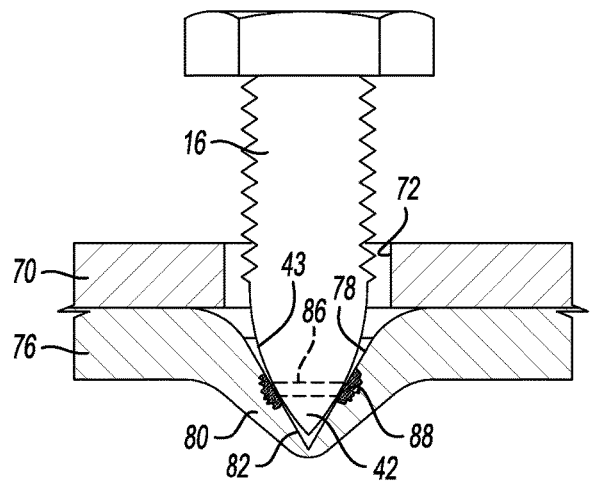
FIG. 7 is a diagrammatic cross-sectional view of a flow-drill screw as it is initially inserted through a pre-formed hole in a first part and rotated in a dimple in a second part to attach the first part to a second part.
Figure 8:
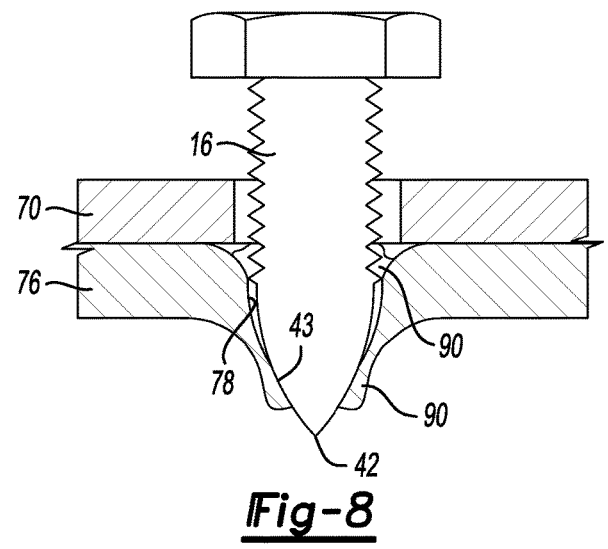
FIG. 8 is a view similar to FIG. 7 showing the flow-drill screw softening the second part and forming a sleeve with material displaced from the second part.
Figure 9:
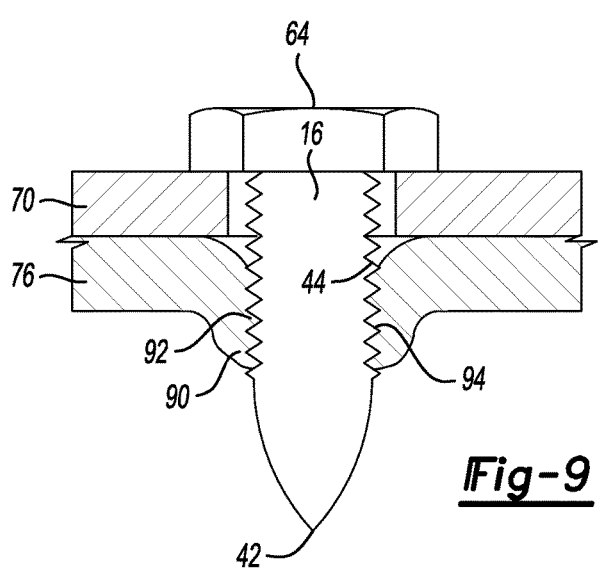
FIG. 9 is a view similar to FIG. 7 showing the flow-drill screw fully inserted into the assembly and connecting the first and second parts by the threaded connection and the head.

Referring to FIGS. 7-9, an alternative embodiment is shown of a process for reducing cycle time for flow-drill screwing operations.

Referring specifically to FIG. 7, a top part 70 defines a hole 72 that is aligned with a dimple 78 formed in a bottom part 76. Again, the reference to top part 70 and bottom part 76 should be understood to refer to the parts as illustrated and should not be construed to limit the orientation of the parts to any particular angular orientation. A flow-drill screw 16 is inserted through the hole 72 in the top part 70 and engages the dimple 78 formed in the bottom part 76. A protrusion 80 is created in the obverse side of the bottom part 76.

The dimple 78 is formed, as previously described with reference to FIGS. 4-6, in a stamping/forming process prior to assembling the top part 70 to the bottom part 76. The dimple 78 includes a base area 82 that includes the pointed recessed tip of the dimple 78. The tip 42 of the flow-drill screw 16 does not contact the base area 82, but instead contacts the dimple 78 in the area of the contact band 86. Rapid rotation of the flow-drill screw 16 causes the tip 42 to frictionally engage the contact band 86 and create a heat focused area 88.

Referring to FIG. 8, as the flow-drill screw process continues, the tip 42 heats the dimple 78 and creates displaced material 90 that flows along the tip 42 of the flow-drill screw 16.

Referring to FIG. 9, a threaded sleeve 92 is formed from the displaced material 90 (shown in FIG. 8). The threaded sleeve 92 includes a plurality of threads 94 that are formed by the threads 44 of the flow-drill screw 16. The head 64 of the flow-drill screw 16 engages the top part 70 and is tightened within the threads 94 to secure the top part 70 to the bottom part 76. In the embodiment of FIG. 9, no adhesive is shown between the top part 70 and the bottom part 76, but it should be understood that adhesive could be provided between the top part 70 and the bottom part 76 if additional holding force is required. If adhesive is provided, it is preferred to space the adhesive from the area joined by the flow-drill screw 16 to avoid interference with the flow-drill screwing process or degradation of the adhesive.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A part assembly method comprising:
   forming a dimple on an insertion side and a protrusion on a contact side of a first part before assembling the first part to a second part;
   inserting a flow-drill screw into the first part with the protrusion contacting the second part; and
   rotating the flow-drill screw to drive the flow drill screw through the dimple and the second part to secure the first part to the second part.

2. The method of claim 1, wherein the dimple is conically shaped.

3. The method of claim 2 wherein the dimple has a sidewall disposed at an angle of between 30° and 60° relative to a surface adjacent the dimple on the insertion side of the first part.

4. The method of claim 1, wherein the flow-drill screw has a convexly curved tip that initially engages the dimple at a location spaced above a base area of the of the dimple.

5. The method of claim 1, wherein the dimple is an elongated slot that includes tapered sides extending from the insertion side of the first part to a base area.

6. The method of claim 1, wherein adhesive is applied between the contact side of the first part and the second part.

7. The method of claim 6 wherein the protrusion penetrates the adhesive, and wherein heat is directly transferred from the protrusion to the second part, minimizing the extent that the adhesive thermally insulates the second part from heat developed in the protrusion.

8. The method of claim 1 wherein the dimple has sides that extend at an angle of between 30 and 60 degrees.

9. The method of claim 1 wherein the dimple has a lead-in surface between the sides and the insertion side.

10. An assembly method comprising:
    forming a dimple having a conical sidewall on a part;
    assembling the part to a second part;
    providing a screw having a tip on a distal end and a convex sidewall;
    heating a contact band on the conical sidewall by rotating the convex sidewall against the contact band with the tip spaced from the part; and
    driving the tip into the part and the second part after heating the contact band.

11. The method of claim 10, wherein the dimple is a conically shaped recess.

12. The method of claim 11 wherein the dimple has a sidewall disposed at an angle of between 30° and 60° relative to a surface adjacent the dimple on the insertion side of the first part.

13. The method of claim 10, wherein the screw has a convexly curved tip that initially engages the dimple at the contact band at a location spaced above a base area of the of the dimple.

14. The method of claim 1, wherein adhesive is applied between the contact side of the part and the second part.

15. The method of claim 14 wherein a protrusion is formed on a side of the part opposite the dimple, wherein the protrusion penetrates the adhesive, and wherein heat is directly transferred from the protrusion to the second part, minimizing the extent that the adhesive thermally insulates the second part from heat transferred from the protrusion.

16. An assembly method comprising:
    forming an elongated recess including tapered sides extending from an insertion side of a part to a base area;
    assembling the part to a second part;
    providing a screw having a tip on a distal end and a convex sidewall;
    heating a contact area on the tapered sides by rotating the convex sidewall against the contact area with the tip spaced from the base area; and
    driving the tip into the base area and the second part after heating the contact band.

17. The method of claim 16 wherein tapered sides of the elongated recess each extend at an angle of between 30 and 60 degrees relative to a surface of the part adjacent the elongated recess.

* * * * *